United States Patent [19]

Bekele

[11] Patent Number: 4,956,212
[45] Date of Patent: Sep. 11, 1990

[54] PEELABLE BARRIER FILM FOR VACUUM SKIN PACKAGES AND THE LIKE

[75] Inventor: Solomon Bekele, Taylors, S.C.

[73] Assignee: W. R. Grace & Co. -Conn., Duncan, S.C.

[21] Appl. No.: 272,617

[22] Filed: Nov. 17, 1988

[51] Int. Cl.$^5$ .............................................. B32B 1/08
[52] U.S. Cl. .................................. 428/36.6; 428/35.4; 428/349; 428/516; 426/127; 206/631.1
[58] Field of Search ...................... 428/35.4, 36.7, 516, 428/349; 426/127; 206/632

[56] References Cited

U.S. PATENT DOCUMENTS 4,886,690 12/1989 Davis et al. ........................ 428/36.6

Primary Examiner—Edith Buffalow
Attorney, Agent, or Firm—John J. Toney; William D. Lee, Jr.; Mark B. Quatt

[57] ABSTRACT

A vacuum skin package for packaging fresh red meat and like articles is produced by using a composite, multilayer, oxygen barrier, vacuum skin package forming film in which the barrier layer can be manually separated from the non-barrier, oxygen permeable layer. After the vacuum skin package is formed to enclose a fresh red meat product in a vacuum the meat will have a purplish color. Then, after storage, the barrier layer can be removed so that the remaining permeable film can admit oxygen to impart the desirable red bloom to the fresh meat. Of importance is the "tear through" feature of the permeable inner layer which has a greater bond strength to the tray than internal strength or layer-to-layer bond strength so that a tab may be torn loose at a score line and then the barrier layer may be readily delaminated and peeled from the permeable layer.

6 Claims, 1 Drawing Sheet

PEELABLE BARRIER FILM FOR VACUUM SKIN PACKAGES AND THE LIKE

FIELD OF THE INVENTION

This invention relates generally to thermoformable barrier films and to vacuum skin packages which can be made therefrom. Particularly, the present invention relates to multi-layer gas barrier films wherein the barrier layer or layers may be peeled and separated from the gas permeable layer or layers.

BACKGROUND OF THE INVENTION

Skin packaging can be classified as a vacuum forming process for thermoformable polymeric films. The product on a supporting member serves as the mold for the thermoformable film which is formed about the product by means of differential air pressure. However, the term "vacuum skin packaging" or VSP as it is referred to hereinafter, refers not only to the fact that the thermoformable film is formed around the product by vacuum or differential air pressure but also to the fact that the product is packaged under vacuum and the space containing the product is evacuated. Thus, there is a need for the film formed around the product and for the support member to be a barrier to oxygen, air, and other gases.

In conventional skin packaging, a backing board which is porous or which is perforated so that a vacuum may be drawn directly through the backing board is employed. In vacuum skin packaging processes generally a vacuum chamber with an open top is used. The product on an impervious backing board is placed on a platform within the vacuum chamber. The top of the chamber is covered by a sheet of film which is clamped tightly against the chamber to form a vacuum tight closure. The chamber is evacuated while the film is heated to its forming and softening temperature. The platform is then raised to drive the product into the softened film and air pressure can be used above the film to force it tightly around the product. A process of this type is disclosed in French Patent No. 1,258,357 which issued to Alain G. Bresson on Mar. 6, 1961.

A variant of the process described in the Bresson patent is disclosed in French Patent No. 1,286,018 which issued on Jan. 22, 1962 to LaRoach Freres Limited. In the LaRoach Freres process, after the chamber has been evacuated and the product driven into the heat softened film, the vacuum is released and ambient air is permitted to enter the chamber so that the thermoplastic film molds more or less onto the product since there is a vacuum on the product side of the film and ambient air pressure on the other side of the film. Australian Patent No. 245,774 which issued to Colbros Proprietary Limited et al on July 16, 1967 discloses a vacuum skin packaging process in which an article to be packaged is inserted within the lower half of a vacuum chamber on a backing board, a thermoplastic film is placed over the open face of the lower half of the chamber, the chamber is closed and both halves are brought to essentially the same state of vacuum, the film is heated and softened, and then atmospheric air is introduced into the upper half of the chamber so that it alone forces the thermoplastic film down around the product and against the backing board.

Another prior art version of vacuum skin packaging is disclosed in U.S. Pat. No. 3,491,504, which issued to W. E. Young et al on Jan. 27, 1970, heat softened film is physically moved down over a stationary product and, in connection with air pressure, the softened thermoplastic film is molded onto the product.

In U.S. Pat. No. RE.30,009, which was reissued on May 29, 1979 to Richard R. Perdue et al, a thermoformable or heat softenable film sheet is drawn by differential air pressure against the concave interior surface of the upper portion of a vacuum chamber, the film is then heated by surface contact, and then, after evacuation of the chamber, air pressure is used to blow the heat softened film down over the product and against the backing board. The resulting package comprises the product positioned on the backing board which is gas impervious and the product is held there by the thermoformable film which has been formed around the product in the exact shape of the product so that it appears to be a "skin." The thermoformable film, as stated previously, is also gas impervious and usually will consist of a number of layers each of which performs a specific function. The product contact and backing member contact layer will be a sealing or heat sealable layer, an interior layer will typically be a barrier layer which comprises a vinylidene chloride copolymer (PVDC) or a hydrolyzed ethylene/vinyl-acetate copolymer (EVOH), and the outer surface layer will be an abuse layer to protect the barrier layer from scratches, pin holes, or from moisture attack. Accordingly, one general object of the present invention is to provide an improved thermoformable film for use in vacuum skin packaging processes.

In U.S. Pat. No. 3,574,642 which issued on Apr. 13, 1971 to Carl Frederick Weinke, a package for and a method of packaging meats is disclosed. The package includes an inner oxygen-permeable member which may be either gas flushed or evacuated and an outer oxygen-impermeable member which may also be gas flushed or evacuated. The package preserves the freshness of the meat until the meat is ready to be marketed to the consumer. For marketing, the outer wrapper is removed and the inner package is displayed at the meat counter for the consumer. Being oxygen-permeable, the inner wrapper admits oxygen to the interior of the package causing the fresh meat product to change to a bright red color which the consumer associates with freshness. The inner pouch of the Weinke package may consist of polyethylene film and the outer pouches may be cellophane film with a coating of saran (vinylidene chloride copolymer or PVDC.) Another patent showing portions of fresh meat individually packaged in oxygen permeable plastic film and inserted into an outer container of impermeable film is U.S. Pat. No. 3,681,092 which issued to Oliver R. Titchness et al on Aug. 1, 1972.

Another prior art package is described in U.S. Pat. No. 3,713,849 which issued to Paul E. Grindrod et al on Jan. 30, 1973. In the Grindrod et al patent a fresh meat package having an outer oxygen impermeable lamina which is readily and entirely peelable from an inner oxygen-permeable lamina is disclosed. The package includes means for initiating the peeling separation along an edge of the package. The outer oxygen barrier maintains meats in well preserved condition in spite of the purplish color which has low consumer appeal. Shortly prior to display for sale to the consumer the outer lamina is removed by the retailer and the product develops a healthy, bright red "bloom" due to the high rate of oxygen permeation through the inner remaining film package. The material disclosed in Grindrod et al is a laminate of PVC/Saran and EVA/Saran. (EVA designates ethylene/vinyl-acetate copolymer and PVC designates polyvinyl-chloride.) The EVA and PVC layers are the inner layers and at the periphery of the package they are sealed together but form a weak bond. The saran layers can be readily peeled from the respective EVA or PVC layers as saran does not form a strong bond between either. Gripping tabs are also provided.

Yet another peelable package is shown in U.S. Pat. No. 4,055,672 which issued on Oct. 25, 1977 to Arthur Hirsch et al. In the Hirsch et al patent a semi-rigid tray of oxygen impermeable material is formed, a meat product placed therein, and then the tray is sealed around its upper periphery or flange area by a composite lid which has an inner layer of oxygen permeable material, an adhesive layer, and an outer layer of oxygen impermeable material. When the package is ready for retail display so that oxygen can reach the fresh meat packaged within the tray, the outer impermeable lid is peeled away so that the oxygen can penetrate through the remaining oxygen permeable portion of the lid. Accordingly, another object of the present invention is to provide a package with a strippable or peelable barrier layer which is an improvement over prior art packages.

In a number of instances in order to preserve a meat product within an impermeable film, it is desirable to provide a modified atmosphere which may include inner gases such as nitrogen or the like or an atmosphere which has a mixture of gases such as oxygen and carbon dioxide to control the bacterial growth within a package. Typical packages are disclosed in U.S. Pat. No. RE.27,872 which issued on Jan. 8, 1974 to J. J. Estes; U.S. Patent No. 2,623,826 which issued on Dec. 30, 1952 to Sanford R. Grinstread; U.S. Pat. No. 3,360,382 was issued on Dec. 26, 1967 to H. V. Miller; U.S. Pat. No. 4,522,835 which issued on June 11, 1985 to Richard E. Woodriff; U. K. Patent No. 1,199,998 which was published July 22, 1970; Canadian Patent No. 890,766 which issued Jan. 18, 1972 to Charles M. Davison et al; U. K. Patent No. 1,378,140 which was published Dec. 18, 1974; and in U. K. Patent No. 1,186,978 which was published Apr. 8, 1970. U.S. Pat. No. 2,925,346 which issued Feb. 16, 1960 discloses a process of packaging cured meat products and inhibiting color degradation by removing oxygen and back filling the container with a gaseous oxide of nitrogen. Accordingly, it is another object of the present invention to provide a vacuum skin package which is suitable for and can be used with modified atmospheres.

In order to readily open packages where plastic film layers have been sealed together to close the package, various tear tabs and easy open mechanisms have been devised. One such easy-to-open, delaminating seal is disclosed in U.S. Pat. No. 4,638,913 which issued on Jan. 27, 1987 to Milton A. Howe, Jr. In this patent, two grippable film folds are provided and the folds when pulled apart will rupture one of the outer layers of the sealed together film and delaminate the film to its edge. In such a case, of course, the bond strength between the two sealed together films must be greater than the layer-to-layer bond of the film. Accordingly, it is still another object of the invention to provide a package which is readily openable.

U.S. Application Ser. No. 136,680 filed Dec. 21, 1987 and assigned to a common assignee with the present application discloses a peelable forming web for vacuum skin packaging in which a gas permeable film has a heat sealable polymeric layer such as a very low density polyethylene or ultra low density copolyethylene, or ethylene vinyl acetate copolymer, and a layer comprising an ethylene alpha-olefin copolymer such as VLDPE or ULDPE; and, bonded to the previously described layer, a gas impermeable film having a plurality of layers including one or two barrier layers of ethylene vinyl alcohol copolymer (EVOH), an abuse layer of for example high density polyethylene, with or without adhesive tie layers between the barrier layers and between the barrier and outside layer.

The foregoing and other objects are achieved by the present invention which is described in the Summary of Invention below, shown in the attached drawings, and further described in the Detailed Description.

SUMMARY OF THE INVENTION

In one aspect, the present invention is a composite, thermoformable web for vacuum skin packages and the like, said web being separable into permeable and impermeable films, comprising a sealant layer comprising a polymeric material selected from the group consisting of ULDPE, and ethylene vinyl acetate copolymer having a vinyl acetate content in the range of 4% to 15% by weight, the sealant layer being one surface layer; a core layer comprising a polymeric material selected from the group consisting of ULDPE, ethylene vinyl acetate copolymer having a vinyl acetate content in the range of 18% to 28% by weight, and a blend of ethylene vinyl acetate copolymer and ionomer, the core layer being adjacent to the sealant layer; an optical layer comprising ULDPE, the optical layer being adjacent to the core layer; a first EVOH layer adjacent to the optical layer; a first tie layer comprising a modified polymeric adhesive, the tie layer being adjacent to the first EVOH layer; a second EVOH layer adjacent to the first tie layer; a second tie layer comprising a modified polymeric adhesive, the second tie layer being adjacent to the second EVOH layer; a layer comprising a polymeric material selected from the group consisting of ethylene vinyl acetate copolymer having a vinyl acetate content of between about 15% and 21% by weight, and a blend of EVA and ULDPE, the layer being adjacent to the second tie layer; and a layer comprising HDPE adjacent said EVA layer, said layer being an outside layer.

BRIEF DESCRIPTION OF THE DRAWINGS

In the drawings which are appended hereto and made a part of this disclosure.

DEFINITIONS

Figure 1:
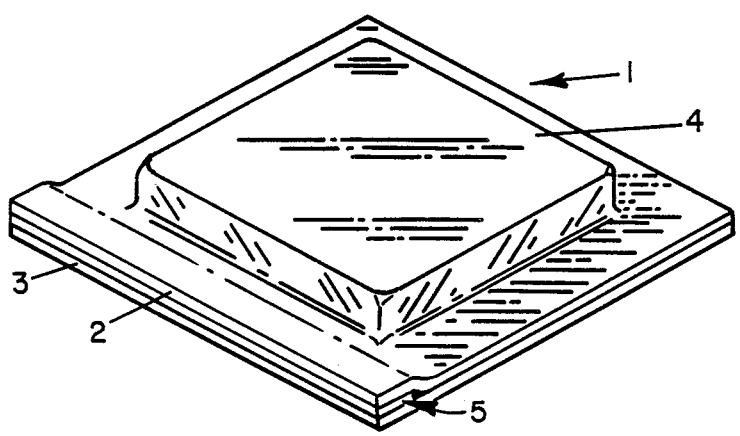
FIG. 1 is a perspective view of one embodiment of a vacuum skin package which can be made using the film and process of the present invention.

As used herein, the following abbreviations and terms have the meanings defined below:

EVA:

EVA designates ethylene/vinyl-acetate copolymers.

HDPE:

HDPE designates high density polyethylene resins. Such resins are generally made by the low pressure process and have a density of greater than 0.940 g/cc.

LLDPE:

LLDPE means linear low density polyethylene which generally is understood to include that group of ethylene/alpha-olefin copolymers having limited side chain branching and which fall into a density range of 0.910 to 0.940 g/cc. Sometimes linear polyethylene in the density range from 0.926 to 0.940 is referred to as linear medium density polyethylene (LMDPE). Typical brand names are Dowlex from Dow Chemical Company, Ultzex and Neozex from Mitsui Petro Chemical Company, and Sclair from du Pont. The alpha-olefin copolymers are typically butene-1, pentene-1, hexene-1, octene-1, etc.

VLDPE and ULDPE:

Very low density polyethylene (VLDPE) and ultra-low density polyethylene (ULDPE) mean ethylene/alpha-olefin copolymers which have a density of less than about 0.915 and, more specifically, usually 0.912 or below and may be below 0.89. Typical VLDPE resins are those designated DFDA by Union Carbide and are believed to principally or usually have butene, or isobutene as a comonomer. The very low density polyethylenes as compared to LLDPE, usually have significantly higher comonomer content and distinctly different properties making them a distinct class of polymers. Typically, resins designated "ULDPE" resins come from Dow and are believed to have octene as the comonomer. There is a slight difference in properties which is thought to be attributable to the comonomer. As used herein the term "linear ethylene/alpha-olefin copolymer having a density of less than 0.915 g/cc" encompasses both VLDPE and ULDPE. (See "Plastics Technology Magazine" for September, 1984 at Page 113 where an article entitled, "INTRODUCING VERY LOW DENSITY PE" appears.)

EVOH:

EVOH means ethylene-vinyl alcohol copolymer, or hydrolyzed ethylene/vinyl-acetate copolymer. EVOH resins are noted for their very good gas barrier properties but tend to be quite moisture sensitive. Typical suppliers of resins are Evalca in the United States and Toya Seiken in Japan.

BARRIER or "Impermeable Material:"

BARRIER, as used herein, means a gas barrier having an oxygen transmission rate, for example, of less than 40 milliliters of oxygen per square meter for 24 hours as set forth in the above mentioned U.S. Pat. No. 3,574,642 for packaging fresh raw meat. Oxygen permeation rates considerably less than 40 can be achieved but for the purposes of this invention a film having a permeation rate of less than 40 will be considered a BARRIER or impermeable film or material.

PERMEABLE MATERIAL:

An oxygen or gas permeable material will be one having an oxygen permeation rate in excess of about 2,000 milliliters of oxygen per square meter for 24 hours. Obviously it is desirable to have as high a permeation rate as possible if the object is to introduce oxygen to the product when the barrier film is peeled away.

OPTICAL LAYER:

As used herein, an optical layer of a multi-layer film designates a layer included to enhance the appearance characteristics of a film so that a product packaged in the film will have a better appearance.

LDPE:

LDPE designates branched chain polyethylene made by the high pressure process and will have a density below 0.940 g/cc and, most often a density of 0.915 to 0.925 as the 0.926 to 0.939 range is often referred to as the medium density range.

DETAILED DESCRIPTION

Turning now to the description of the invention reference is first made to FIG. 1 where vacuum skin package 1 is shown. This package comprises a support member 3 which is a gas impermeable member preferably formed of polyvinyl chloride material (PVC) as a substrate material coated with a barrier material and a heat sealing material; or, it can be a material such as a polystyrene foam which also is coated with a barrier material and a heat sealing material. Typical heat sealing materials are branched low density polyethylene (LDPE), ionomers such as the Surlyn brand sold by du Pont, and EVA copolymers. The support member 3 may be flat as shown or it may be formed in the shape of a tray.

The product 4 positioned on the support member 3 will, in general, be a food product such as fresh red meat. Particularly, the prime cuts of beef, pork, and lamb would be the preferred food products. When these products are vacuum skin packaged or packaged in an atmosphere in the absence of oxygen the fresh meat will tend to turn a purplish color and remain that way as long it is chilled and kept out of contact with oxygen. The bright red "bloom" is restored when the meat makes contact with oxygen again.

Figure 4:
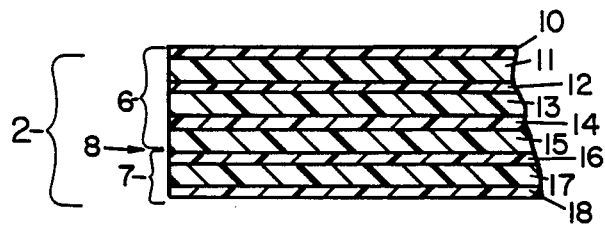

The thermoformable film 2 which covers the product 4 and is sealed around the perimeter of the product in a manner to assume the exact shape of the product and, thus, become a "skin" is a composite film and is shown in greater detail in FIG. 4. In FIG. 4, which is a schematic representation of the layers in film 2, the two films 6 and 7 which make up the composite 2 are shown bonded at interface 8. Film 2 is preferably coextruded and as shown nine layers are coextruded together. The two layers 15 and 16 which form the interface 8 are materials which do not readily adhere one to the other and form a relatively weak bond. Preferred materials are EVOH for layer 15 and ULDPE for layer 16. When the barrier or gas impermeable film employs a layer of PVDC as the barrier layer usually only an abuse layer 11 need be added with a suitable internal adhesive layer. This abuse material can be high VA EVA, ULDPE, ionomer or blends of these. In some instances it may be necessary to have an adhesive layer and the selection of a proper adhesive is well within the skill of those in the art.

In a preferred embodiment, in order to achieve very good barrier properties, two layers of EVOH are employed. The first layer 15 is the interface layer with layer 16 and the second layer 13 of EVOH is disposed between two adhesive or tie layers 12 and 14. The adhesive layer 12 is adhered to an implosion resistance/abuse layer 11. Since the EVOH layer 13 is an interior layer it is protected from moisture attack and will retain its low oxygen permeability. Thus, even if moisture were to penetrate the weak bond between layers 15 and 16 at interface 8 during storage under moist conditions and significantlY degrade the barrier properties of layer 15, layer 13 would be protected and would maintain the excellent barrier properties of the composite film.

The gas permeable film 7 comprises an interface layer 16 of ULDPE of a density of between 0.900 and 0.912 grams per cubic centimeter. For good package optics after peeling of the impermeable film from the permeable film, a density of about 0.912 grams per cubic centimeter is preferred. An example of such a material is ATTANE 4002 available from Dow. Most preferably, a slip/wax concentrate is also added at about 10% by weight of the total blend to aid and facilitate the delamination and peeling mechanism. The preferred concentrate contains 4% calcined clay with about 4.5% erucamide, stearamide or behenamide and a 91.5% low density polyethylene carrier.

The gas permeable film 7 comprises a sealant layer 18 having preferably an ethylene vinyl acetate copolymer with a vinyl acetate content of between about 4 and 15% by weight. An especially preferred material is a 12% vinyl acetate EVA, Exxon X574.16. This sealant layer provides a strong seal to the support member 3 considerably exceeding the bond strength between layers 15 and 16. An alternative sealant material is ULDPE with a density of between about 0.900 and 0.912 grams per cubic centimeter, or an ionomer.

The center or core layer 17 of the permeable film 7 is preferably a blend of an ethylene vinyl acetate copolymer and an ionomer. Preferred blends are between 50 and 80% of the EVA and between 20 and 50% of the ionomer. Preferred EVA materials in this blend have a vinyl acetate copolymer content of between about 15 and 28% by weight of the EVA. An especially preferred blend is 70% EVA (21% vinyl acetate) and 30% ionomer. A commercial example of resins suitable for this preferred blend are ELVAX 3543 and Surlyn F1605 both available from du Pont. An alternative material is ULDPE, preferrably of about 0.905 grams per cubic centimeter, or an EVA with a vinyl acetate content of between about 18 and 28% by weight. The most preferred example of a material or blend for layer 17 provides between about 6,000 and 7,000 cubic centimeters/24 hours meters squared atmosphere mil oxygen transmission for rapid blooming of the peeled package (i.e. less than 1 hour before bloom) combined with a tensile modulus of between 20,000 and 30,000 PSI to provide package integrity after the package is peeled.

As mentioned above, layers 15 and 13 are both EVOH layers which have been found to provide a good peeling mechanism (layer 15) and improved shelf life. Prefered EVOH resins contain between 27 and 44 mole percent of ethylene, and preferably about 27%. An example of a suitable material for layers 13 and 15 is EVAL EC-L101 available from Evalca.

Layers 12 and 14 are polymeric adhesive layers with good moisture barrier and adhesive properties for bonding EVOH to other materials. Preferred adhesives are Plexar 169 or Plexar 3255 available from Quantum Chemical. The Plexar 169 is a low density polyethylene based polymeric adhesive. The Plexar 3255 is a medium density polyethylene based polymeric adhesive. Both materials containing anhydride functionalities.

Layer 11 like layer 17, functions as an implosion resistant/abuse layer. A preferred material for layer 11 is EVA with a vinyl acetate content of between 15 and 21%, and preferably about 18%. Elvax 3165 available from du Pont as an example of such a resin. Alternatively, a blend of EVA with a vinyl acetate content of 18%, and ULDPE with a density of about 0.905 can also be used. A preferred ratio for this blend is 50 to 70% EVA and 30 to 50% ULDPE. Commercial resins preferred for such a blend are Elvax 3170 from du Pont and Attane 4003 from Dow.

Layer 10 is an outside layer which provides high gloss and good moisture barrier properties. A preferred material for layer 10 is HDPE such as SOLTEX XF-337K available from Solvay.

The specific best mode of the forming web for vacuum skin packaging and the like which is separable into permeable and impermeable films has as the permeable skin film or layer 7 a construction as follows:

Sealant Layer (18) / Core Layer (17) / Optical Layer (16)
0.20–0.60      1.75–2.50      0.10–0.20      mils thickness Wherein:
Sealant = ULDPE from Dow, or,
EVA copolymer having 12% VA from Exxon
Core = Blend of:
20-50% EVA copolymer having 15% to 28% VA content and
50-80% Ionomer
Optical = 90% ULDPE from Dow, resins 4002A or 4002B +
10% Slip/Wax concentrate The impermeable or peelable barrier film has the following construction:

EVOH/Modified adhesive/EVOH/Modified
adhesive/EVA (18% VA)/HDPE (Outside)

| 0.20 | 0.20 | 0.20 | 0.20 | 1.50 | 0.20 | Thickness (mils) |

Wherein:
EVOH=ethylene/vinyl-alcohol from Evalca
Modified adhesive=Anhydride-modified Adhesive, preferably Plexar from Quantum
EVA=EVA copolymer having 18% VA
HDPE=High density PE from Solvay Using the best mode web, retail shelf life between 23 and 28 days can be achieved for T-bone steak cuts whereas with the single layer of EVOH only about a seven day shelf life can be expected. It has also been found that the interface of EVOH/ULDPE between the permeable and impermeable films provides the easiest delamination or peeling of the barrier or impermeable film. Furthermore, the LDPE based tie or adhesive provides the best combination of adhesion to the EVOH layers plus moisture protection of the EVOH.

To make the composite film or web, a coextrusion process similar to that described in U.S. Pat. No. 4,287,151 to Esakov et al on Sept. 1, 1981 may be employed. Suitable annular multi-laYer dies must, of course, be used and these are well known in the art.

In the preferred process, the film of the present invention is cast coextruded using 7 extruders. After extrusion, the film is irradiated to a dosage of between about 9 and 18 megarads, preferably at 12 megarads to cross link the structure and enhance its mechanical strength. Irradiation also enables the material to withstand high forming temperatures up to about 250° C. Radiation levels below about 9 or above about 18 megarads is detrimental to the film performance. At the low of about 9 megarads, a less desirable package with an increased incidence of wrinkles, pleats and creases is made. Above about 18 megarads, the film becomes more brittle and will lose some of its implosion resistance.

Figure 2:
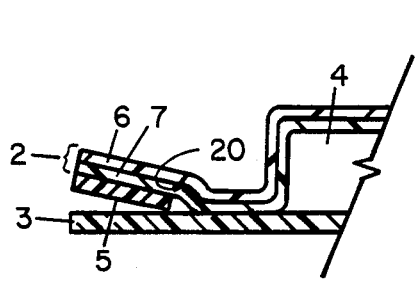
FIG. 2 shows one embodiment of a tab arrangement for delaminating or peeling apart the two films comprising the composite peelable film of the present invention.
Figure 3:
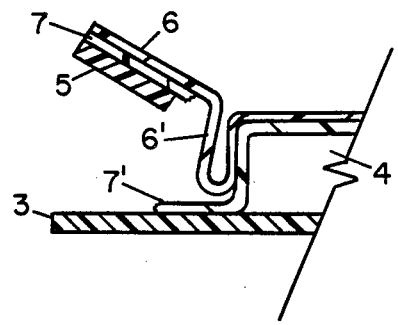
FIG. 3 shows the peeling process shown in FIG. 2 underway after rupture of a portion of the permeable film has taken place; and, FIG. 4 is a schematic cross section of the composite film of the present invention.

Looking now at FIGS. 2 and 3 tab 5 has been laid across one edge of the vacuum skin package as can be seen by the dotted line in FIG. 1 so that in forming of upper web 2, the composite film, around product 4, it does not adhere to the supporting web or film 3. This allows for a tab to form as can be seen in FIG. 2 that can be gripped and moved upwardly by the fingers to a position shown in FIG. 3. In this position it can be seen that the permeable film 7 has torn or ruptured rather than break loose or delaminate its bond with the support member 3. This leaves the film portion 7' firmly adhered to the support member 3. This type of strong bond is formed between the VLDPE or EVA surface of the film 7 with the coated PVC of the support member. Surfaces such as LDPE, EVA, and ionomers adhere strongly to each other and their bond strength is greater than the internal cohesive strength of film 7.

Also seen in FIG. 3 is the beginning of the delamination of the permeable film 6 from the impermeable film 7. The already peeled apart portion 6' has separated from the bonded portion 7' so that the entire impermeable film 6 may be peeled from the permeable film 7 leaving the inner "skin" package comprising support member 3, peeled, permeable film 7', and product 4.

When product 4 is a fresh red meat product, it will, within half an hour to an hour, regain its bright red bloom and is then ready for display in a showcase.

The invention may be further understood by reference to the following examples.

EXAMPLE 1

A multilayer film was coextruded having a sealant layer of a blend of 95% EVA (Exxon X574.16) and 5% of an antiblock agent (90% of a low density polyethylene+10% of a colloidal silica).

A layer corresponding to reference numeral 17 in FIG. 4 comprised 70% of an EVA (Elvax 3543) and 30% of an ionomer (Surlyn F1605).

The next layer corresponding to interface layer 16 of FIG. 4 was a blend of 90% of ULDPE (Attane 4002) and 10% of a slip/wax concentrate containing 4% calcined clay with about 4.5% erucamide, stearamide or behenamide and 91.5% low density polyethylene carrier.

The next layer was a first barrier layer comprising EVOH (EVAL EP-L101).

The first EVOH layer was bonded to a second identical EVOH layer by means of an intervening layer of a polymeric adhesive (Plexar 169).

A layer comprising an EVA (Elvax 3165) was bonded to the second EVOH layer by means of an intervening polymeric adhesive (Plexar 169).

The outside layer, corresponding to reference numeral 10 of FIG. 4, comprised a high density polyethylene (Fortiflex XF-337K).

The final film had a thickness of about 6 mils.

EXAMPLE 2

A multilayer film like that of Example 1 was coextruded, having in the layer adjacent the sealant layer a blend of 60% EVA (Elvax 3190) and 40% ionomer (Surlyn 1707).

EXAMPLE 3

A multilayer film like that of Example 1 was produced, but having in the layer adjacent the sealant layer a blend of 50% EVA (Elvax 3170) blended with 50% ionomer (Surlyn 1707).

EXAMPLE 4

A multilayer film like that of Example 1 was produced, but having a different polymeric adhesive, Plexar 3255 (based on medium density polyethylene) in place of the Plexar 169 (based on low density polyethylene) of Example 1.

EXAMPLE 5

A multilayer film like that of Example 1 was produced, but having, in the layer adjacent the sealant layer, a blend of 80% EVA (Elvax 3543) and 20% ionomer (Surlyn F1605).

Upon reading and becoming familiar with the disclosure herein, equivalent layer combinations and packages will likely become evident or obvious to those skilled in the art. However, the present invention is to be limited only by the scope of the following claims:

What is claimed is:

1. A thermoformable web for vacuum skin packages and the like which is separable into permeable and impermeable films comprising:
    (a) a sealant layer comprising a polymeric material selected from the group consisting of ULDPE, and ethylene vinyl acetate copolymer having a vinyl acetate content in the range of 4% to 15% by weight, said sealant layer being one surface layer;
    (b) a core layer comprising a blend of ethylene vinyl acetate copolymer and ionomer, said core layer being adjacent to said sealant layer;
    (c) an optical layer comprising ULDPE, said optical layer being adjacent said core layer;
    (d) a first EVOH layer adjacent to said optical layer;
    (e) a first tie layer comprising a modified polymeric adhesive, said tie layer being adjacent said first EVOH layer;
    (f) a second EVOH layer adjacent said first tie layer;
    (g) a second tie layer comprising a modified polymeric adhesive, said second tie layer being adjacent said second EVOH layer;
    (h) a layer comprising a blend of EVA and ULDPE, said layer being adjacent said second tie layer; and
    (i) a layer comprising HDPE adjacent said EVA layer, said layer being an outside layer.

2. A thermoformable web according to claim 1 wherein the sealant layer is capable of sealing to a polymeric surface with a bond strength greater than the force required to rupture and subsequently delaminate said permeable film from said impermeable film.

3. A thermoformable web according to claim 1 wherein the core layer of the gas permeable film comprises a blend of between about 20% and 50% of an ethylene vinyl acetate copolymer, and between about 50% and 80% of an ionomer.

4. A thermoformable web according to claim 3 wherein the blend comprises an ethylene vinyl acetate copolymer having a vinyl acetate content of between about 15% and 28% by weight.

5. A thermoformable web according to claim 1 wherein the blend of EVA and ULDPE of layer (h) comprises a blend of between about 50% and 70% of an EVA, and between about 30% and 50% of ULDPE.

6. A vacuum skin package wherein the forming web is a film according to claim 1.

* * * * *